US009600512B2

(12) United States Patent
Gasn et al.

(10) Patent No.: US 9,600,512 B2
(45) Date of Patent: Mar. 21, 2017

(54) SYSTEMS AND METHODS FOR IMPLEMENTING CUSTOMIZED DROP-DOWN MENUS

(75) Inventors: Marni Gasn, San Mateo, CA (US); Herman Kwong, Danville, CA (US)

(73) Assignee: salesforce.com, inc., San Francisco, CA (US)

( * ) Notice: Subject to any disclaimer, the term of this patent is extended or adjusted under 35 U.S.C. 154(b) by 1011 days.

(21) Appl. No.: 12/879,222

(22) Filed: Sep. 10, 2010

(65) Prior Publication Data

US 2011/0209094 A1  Aug. 25, 2011

Related U.S. Application Data

(60) Provisional application No. 61/308,235, filed on Feb. 25, 2010.

(51) Int. Cl.
| G06F 3/0481 | (2013.01) |
| G06F 3/0482 | (2013.01) |
| G06F 3/0483 | (2013.01) |
| G06Q 10/10 | (2012.01) |
| G06F 17/30 | (2006.01) |

(52) U.S. Cl.
CPC .. G06F 17/30365 (2013.01); G06F 17/30557 (2013.01)

(58) Field of Classification Search
CPC .......... G06Q 10/10; A61B 6/00; A61B 6/467; G06F 3/0482; G06F 3/0481; G06F 9/4443; G06F 3/04817; G06F 3/0483; H04N 5/44543
USPC ........................................ 715/810, 764, 843
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Mark A Radtke
*Assistant Examiner* — Erik Stitt
(74) *Attorney, Agent, or Firm* — Weaver Austin Villeneuve & Sampson LLP

(57) ABSTRACT

Systems and methods for implementing customized drop-down menus in user interface displays. Drop-down menus include one or more selection options and a table having multiple fields. Drop-down menu items are particularly useful for assisting a user with assigning information synchronized into a target database from one database system, such as an Outlook file, to objects in the target database system, such as a multi-tenant database system as well as providing suggestions to the user from search results when they may want to choose one of those results or perform a different action altogether.

19 Claims, 14 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 5,983,227 A | 11/1999 | Nazem et al. |
| 6,011,555 A * | 1/2000 | Eckhoff et al. ............... 715/843 |
| 6,049,776 A * | 4/2000 | Donnelly et al. ............ 705/7.14 |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,208,340 B1 * | 3/2001 | Amin et al. .................. 715/808 |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,130,812 B1 * | 10/2006 | Iyer et al. .................... 705/7.11 |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,487,117 B1 * | 2/2009 | Tamura .................. G06Q 10/08 705/26.5 |
| 7,508,758 B1 | 3/2009 | Kekki |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,840,589 B1 * | 11/2010 | Holt et al. .................... 707/769 |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,090,754 B2 * | 1/2012 | Schmidt ............ G06F 17/30595 707/726 |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,332,780 B2 * | 12/2012 | Danninger .................... 715/843 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,606,639 B1 * | 12/2013 | Sun ...................... G06Q 10/067 705/26.1 |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0093483 A1 * | 5/2003 | Allen et al. .................... 709/207 |
| 2003/0115080 A1 * | 6/2003 | Kasravi .................. G06F 17/27 715/254 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |

(56) References Cited

U.S. PATENT DOCUMENTS

| | | |
|---|---|---|
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0176967 A1* | 9/2004 | Whittenberger ............... 705/1 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243676 A1* | 12/2004 | Blankenship ............... 709/206 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0108262 A1* | 5/2005 | Fawcett et al. ............... 707/100 |
| 2005/0197852 A1* | 9/2005 | Gebhard et al. ............... 705/1 |
| 2005/0240881 A1* | 10/2005 | Rush .................. G06F 3/0482 715/851 |
| 2007/0061746 A1* | 3/2007 | Folting et al. ............... 715/764 |
| 2008/0249972 A1 | 10/2008 | Dillon |
| 2008/0276218 A1* | 11/2008 | Taylor et al. ............... 717/106 |
| 2009/0007009 A1* | 1/2009 | Luneau et al. ............... 715/808 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0281047 A1* | 11/2010 | Danninger ............... 707/769 |
| 2011/0016432 A1* | 1/2011 | Helfman ............... 715/843 |
| 2011/0060719 A1* | 3/2011 | Kapoor ............... 707/602 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

Khushboo Pandey "Introducing the 'Import Data Wizard' in Microsoft Dynamics CRM Online Service Update for Nov. 2009" Microsoft Developer 2009.

Eric Boocock "Using the Microsoft Dynamics CRM Online Import Wizard" Microsoft Developer 2009.

Arun Kumar "Importing data into Microsoft Dynamics CRM Online—Accounts & Contacts" Microsoft Developer 2009.

* cited by examiner

FIG. 3a

Synced Contacts Needing Accounts                                                                                    Customize Columns Sync  Cancel

| | First Name | Last Name ▵ | Outlook Company | Salesforce Account | Email Address | Created Date |
|---|---|---|---|---|---|---|
| ☐ | Michael | Abbott | Global | Select Account Action | mabbott@global.com | 8/23/2008 |
| ☐ | Jon | Amos | Sync World, Inc. | Select Account Action | jamos@syncworld.com | 8/23/2008 |
| ☐ | David | Buchanon | I.B.M. | | db@ibm.com | 8/23/2008 |
| ☐ | Sara | Budsly | I.B.M. | Select Account Action | sara@gmail.com | 8/23/2008 |
| ☐ | Tim | Burr | I.B.M. | Select Account Action | tim.burr@yahoo.com | 8/23/2008 |
| ☐ | Lisa | Chu | EZ Peet's | Select Account Action | lchu@ez.com | 8/23/2008 |

FIG. 3b

Outlook Queue  Help for this Page

Your Outlook contacts have synced with salesforce.com. We matched existing contacts whenever possible, created new contacts if we didn't find a match, and automatically assigned certain contacts to accounts. Now tell us how to assign the rest of them! To view your sync settings, check out your Outlook configuration.

Synced Contacts Needing Accounts                                                                                    Customize Columns Sync  Cancel

| First Name | Last Name ▵ | Outlook Company | Salesforce Account | Email Address | Created Date |
|---|---|---|---|---|---|
| Michael | Abbott | Global | Select Account Action | mabbott@global.com | 8/23/2008 |
| Jon | Amos | Sync World, Inc. | Select Account Action | jamos@syncworld.com | 8/23/2008 |
| David | Buchanon | I.B.M. | Select Account Action | db@ibm.com | 8/23/2008 |
| Sara | Budsly | I.B.M. | Select Account Action | sara@gmail.com | 8/23/2008 |
| Tim | Burr | I.B.M. | Select Account Action | tim.burr@yahoo.com | 8/23/2008 |
| Lisa | Chu | EZ Peet's | Select Account Action | lchu@ez.com | 8/23/2008 |

Synced Contacts Needing Accounts   Save | Cancel

| | First Name | Last Name △ | Outlook Company | Salesforce Account | Email Address | Created Date |
|---|---|---|---|---|---|---|
| ☐ | Michael | Abbott | Global | | mabbott@global.com | 8/23/2008 |
| ☐ | Jon | Amos | Sync World, Inc. | Select Account Action ⇅ | | |
| ☐ | David | Buchanon | I.B.M. | Select Account Action | | |
| ☐ | Sara | Budsly | I.B.M. | Search Salesforce.com... | | |
| ☐ | Tim | Burr | I.B.M. | Create new account... | | |
| ☐ | Lisa | Chu | EZ Peet's | Don't assign account | lchu@ez.com | 8/23/2008 |

Choose Suggested Account:
| Account Name | Account Owner | Last Modified | Shipping City |
|---|---|---|---|
| Global | Jon Smith | 10/14/09 | San Francisco |
| Global | Jane Doe | 08/10/09 | San Diego |
| Global, Inc. | Sally Hanson | 02/24/08 | New York |

Select Account Action ⇅

FIG. 3d

Synced Contacts Needing Accounts   Save | Cancel                                                Customize Columns

| | First Name | Last Name △ | Outlook Company | Salesforce Account | Email Address | Created Date |
|---|---|---|---|---|---|---|
| ☐ | Michael | Abbott | Global | Global Corp. ⇅ | mabbott@global.com | 8/23/2008 |
| ☐ | Jon | Amos | Sync World, Inc. | Select Account Action ⇅ | jamos@syncworld.com | 8/23/2008 |
| ☐ | David | Buchanon | I.B.M. | Select Account Action ⇅ | db@ibm.com | 8/23/2008 |
| ☐ | Sara | Budsly | I.B.M. | Select Account Action ⇅ | sara@gmail.com | 8/23/2008 |

FIG. 4b

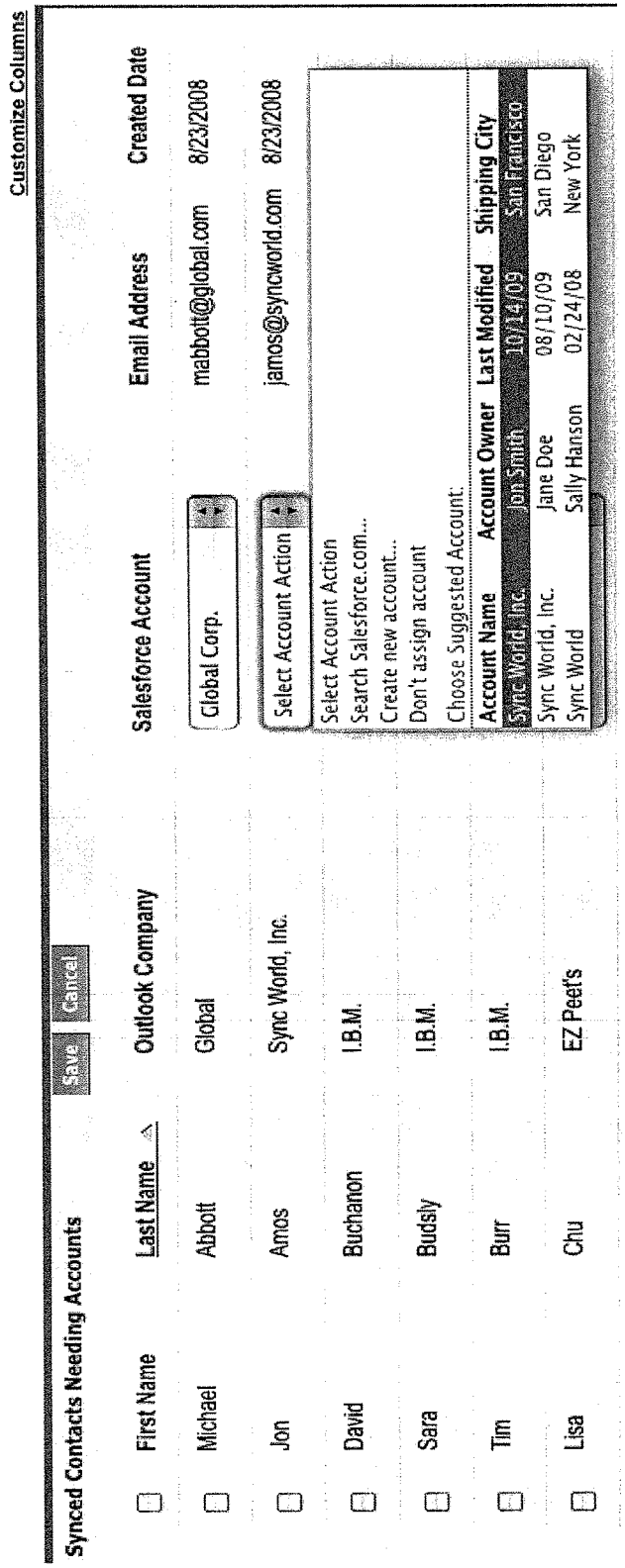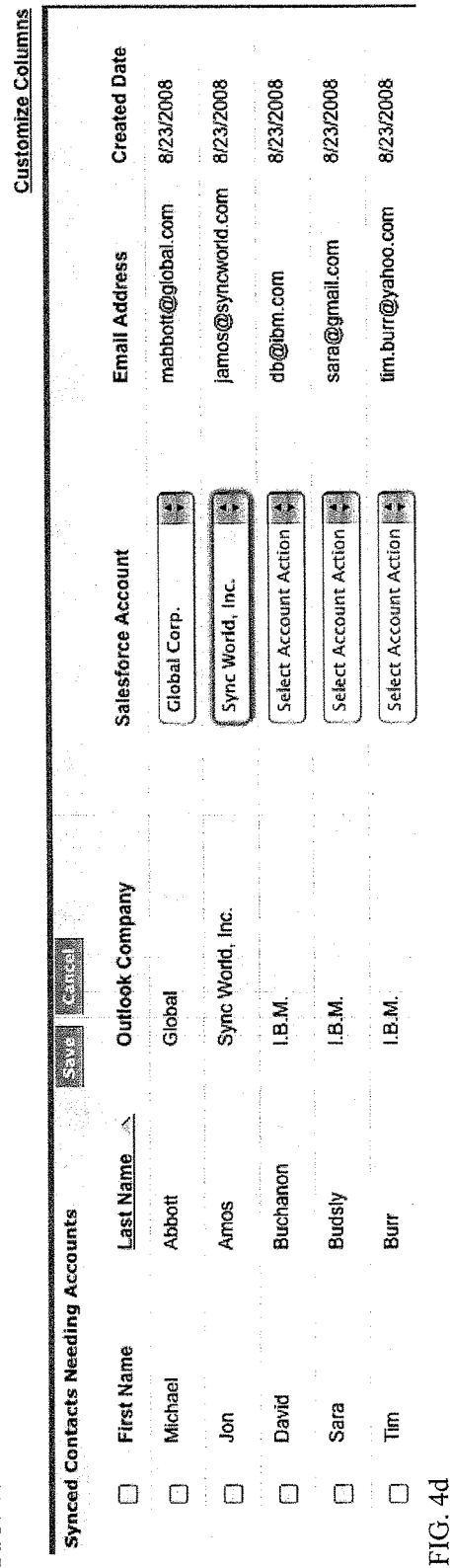
FIG. 4c
FIG. 4d

Synced Contacts Needing Accounts  [Save] [Cancel]                                                                 Customize Columns

| | First Name | Last Name ▲ | Outlook Company | Salesforce Account | Email Address | Created Date |
|---|---|---|---|---|---|---|
| ☐ | Michael | Abbott | Global | Global Corp. | mabbott@global.com | 8/23/2008 |
| ☐ | Jon | Amos | Sync World, Inc. | Sync World, Inc. | jamos@syncworld.com | 8/23/2008 |
| ☑ | David | Buchanon | I.B.M. | Select Account Action | db@ibm.com | 8/23/2008 |
| ☑ | Sara | Budsly | I.B.M. | Select Account Action | sara@gmail.com | 8/23/2008 |
| ☑ | Tim | Burr | I.B.M. | Select Account Action | tim.burr@yahoo.com | 8/23/2008 |
| ☐ | Lisa | Chu | EZ Peet's | Select Account Action | lchu@ez.com | 8/23/2008 |

FIG. 5b

Synced Contacts Needing Accounts  [Save] [Cancel]                                                                 Customize Columns

| | First Name | Last Name ▲ | Outlook Company | Salesforce Account | Email Address | Created Date |
|---|---|---|---|---|---|---|
| ☐ | Michael | Abbott | Global | Global Corp. | mabbott@global.com | 8/23/2008 |
| ☐ | Jon | Amos | Sync World, Inc. | Sync World, Inc. | jamos@syncworld.com | 8/23/2008 |
| ☑ | David | Buchanon | I.B.M. | Select Account Action | db@ibm.com | 8/23/2008 |
| ☑ | Sara | Budsly | I.B.M. | | | |
| ☑ | Tim | Burr | I.B.M. | | | |
| ☐ | Lisa | Chu | EZ Peet's | | | |

Select Account Action
Search Salesforce.com...
Create new account...
Don't assign account
Choose Suggested Account:

| Account Name | Account Owner | Last Modified | Shipping City |
|---|---|---|---|
| I.B.M. | Jon Smith | 10/14/09 | San Francisco |
| I.B.M. | Jane Doe | 08/10/09 | San Diego |

Synced Contacts Needing Accounts

SAVE  CANCEL

Customize Columns

| | First Name | Last Name ▲ | Outlook Company | Salesforce Account | Email Address | Created Date |
|---|---|---|---|---|---|---|
| ☐ | Michael | Abbott | Global | Global Corp. ▼ | mabbott@global.com | 8/23/2008 |
| ☐ | Jon | Amos | Sync World, Inc. | Sync World, Inc. ▼ | jamos@syncworld.com | 8/23/2008 |
| ☐ | David | Buchanon | I.B.M. | I.B.M. ▼ | db@ibm.com | 8/23/2008 |
| ☐ | Sara | Budsly | I.B.M. | I.B.M. ▼ | sara@gmail.com | 8/23/2008 |
| ☐ | Tim | Burr | I.B.M. | I.B.M. ▼ | tim.burr@yahoo.com | 8/23/2008 |
| ☐ | Lisa | Chu | EZ Peet's | Select Account Action ▼ | lchu@ez.com | 8/23/2008 |

SYSTEMS AND METHODS FOR IMPLEMENTING CUSTOMIZED DROP-DOWN MENUS

CROSS-REFERENCES TO RELATED APPLICATIONS

This application claims the benefit of U.S. Provisional Application Ser. No. 61/308,235, filed Feb. 25, 2010, the disclosure of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to user interfaces, and more particularly to customized drop-down menus for use in user interface displays.

It is often desirable to import information from one database system into another system. For example, it may be desirable to import contact records or events from a source such as Microsoft Outlook® into a different target database system, such as into one or more objects of a multi-tenant database system. Once imported, or synchronized in the target database, it is generally desirable to associate contact records or events with, or assign the contact records or events to, objects in the target database system. However, current methods are cumbersome and tend not to be user-friendly.

Accordingly, it is desirable to provide tools to assist a user with integrating information from a database source into a target database system.

SUMMARY

Embodiments of the present invention provide systems, methods and user interface tools to assist a user with integrating information from a database source into a target database system. In the examples described below, reference will be made to integrating synchronized Outlook® contact records into Account objects in the salesforce.com platform, however, it should be understood that the methods and systems described herein are applicable to other source and target databases as well as other data types.

The present invention provides systems and methods for implementing customized drop-down menus in user interface displays. Drop-down menus include, in certain embodiments, one or more selection options and a table having multiple fields. Drop-down menu items are particularly useful for assisting a user with assigning information from one database system, such as an Outlook file, to objects in a different database system, such as a multi-tenant database system as well as providing suggestions to the user from search results when they may want to choose one of those results or perform a different action altogether.

According to one aspect of the present invention, a method of assigning information from a source database to a target database is provided. The method typically includes displaying or rendering a panel identifying one or more synchronized records from the source database to be assigned to the target database, the panel including a drop-down menu item associated with each displayed record, and performing a search of objects in the target database using one or more fields of the identified records to determine possible matching objects for each identified record, upon selection of the drop-down menu item by a user for a specific record, displaying or rendering a drop down menu including a table identifying information for one or more possible matching objects for that specific record, receiving a selection of a specific one of the possible matching objects, and upon receiving confirmation, assigning fields of the specific record to the selected object.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 3a illustrates an example of a user interface display panel that includes contact records that are available to be integrated into Account objects in a target database system (salesforce.com in the present example) from Outlook, according to one embodiment.

FIG. 3b shows an example of a user interface display panel similar to the panel shown in FIG. 3a, but without selection checkboxes.

FIG. 3d illustrates the drop-down menu 360 of FIG. 3c as it might be displayed on the panel 300 of FIG. 3a.

FIG. 4b illustrates the panel of FIG. 3d after an assignment to a newly created Account has been selected.

FIG. 4c illustrates what might be displayed to the user subsequently after the user selects the drop-down menu toggle for the second Outlook contact record that needs assignment to an Account object.

FIG. 4d illustrates the panel of FIG. 4c after an assignment to an existing Account object has been selected.

FIG. 4e illustrates a panel that might be displayed when a user seeks to synchronize events from an external source, such as Outlook events, into a target multi-tenant database.

FIG. 5a illustrates a display panel including checkboxes that allow a user to identify records to which mass actions can be applied.

FIG. 5b illustrates the panel of FIG. 5a with selected checkboxes.

FIG. 5c illustrates the panel of FIG. 5b after the user has selected a specific Account object from the table in the drop-down menu for a specific Outlook record.

FIG. 7 illustrates a panel including lists of contacts from a different source; in this example, contact records were brought in based on the "To" line in an email or event invite

DETAILED DESCRIPTION

The present invention provides systems and methods for implementing customized drop down menus for use in user interface displays. Such drop-down menus are particularly useful for integrating information from an external source into a database system, such as a multi-tenant database system. For example, such menus are particularly useful for integrating records from one information source, such as MS Outlook, into a target database system. Menus according to certain embodiments allow users to quickly and easily navigate and assign information from the source to particular objects of the target database.

General Overview

Systems and methods are provided for implementing customized drop down menus for use in user interface displays, and in particular for user interface displays for use with database systems, including multi-tenant database systems.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query plan refers to a set of steps used to access information in a database system.

System Overview

Figure 1:
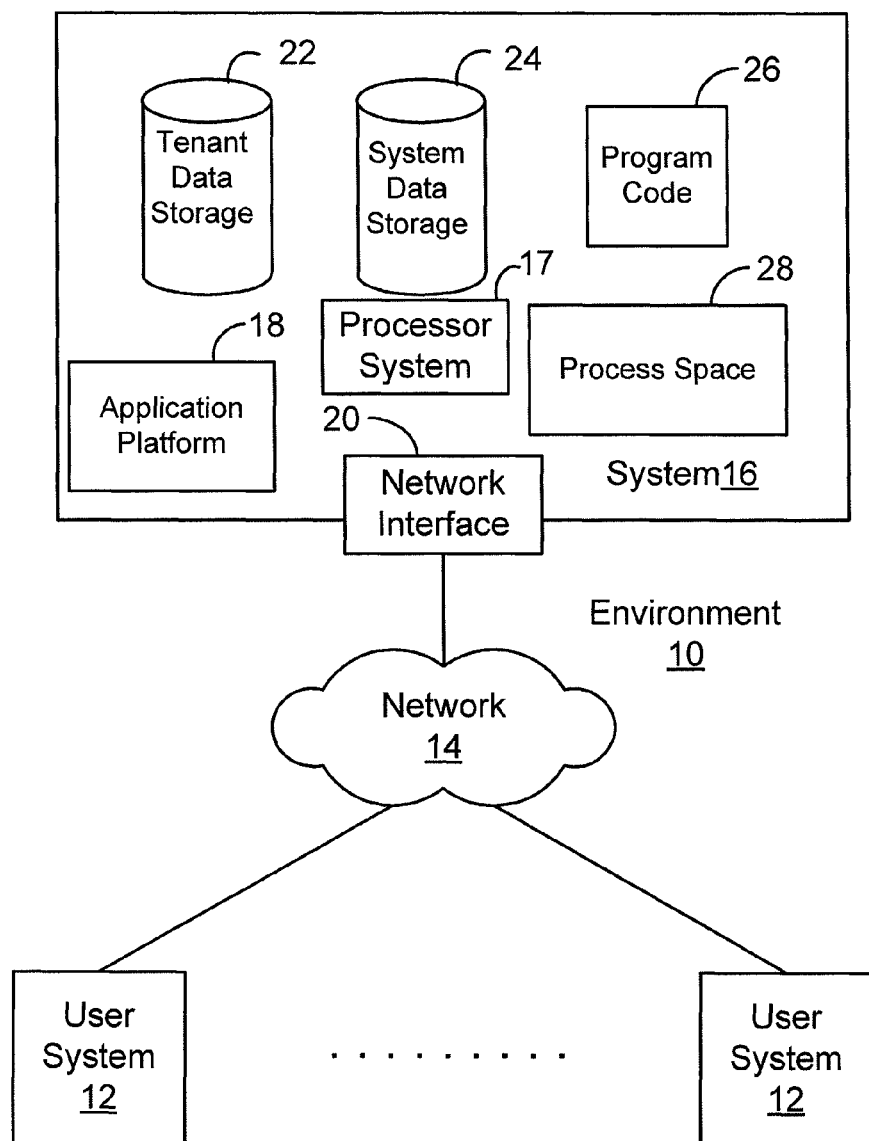
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
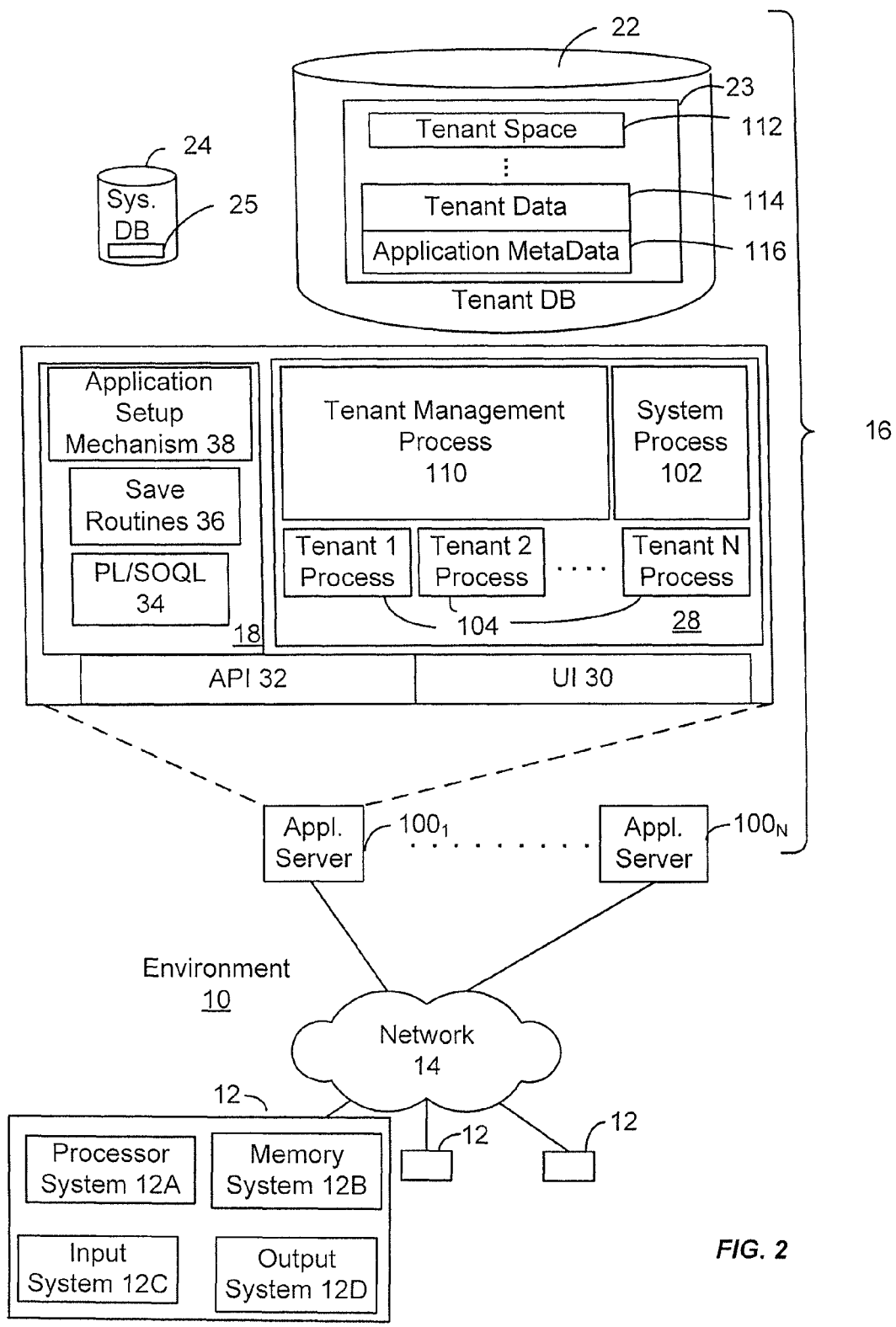
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Often it is desirable to import information from one system into another system. For example, it may be desirable to import contact records or events from a source such as Microsoft Outlook® into a different target database system, such as into one or more objects of a multi-tenant database system. Once imported, or synchronized in the target database, it may be desirable to associate contact records or events with, or assign the contact records or events to, objects in the target database system. According to various embodiments, systems, methods and user interfaces are provided to assist a user with integrating information from a database source into a target database system. In the examples described below, reference will be made to integrating synchronized contact records into Account objects in the salesforce.com platform, however, it should be understood that the methods and systems described herein are applicable to other source and target databases.

Customized Drop-Down Menus

FIG. 3*a* illustrates an example of a user interface display panel representing an assignment queue that includes synchronized contact records that are available to be integrated into Account objects in a target database system (salesforce.com in the present example) from Outlook. As shown, various fields are displayed: First name, Last Name, Outlook Company, Email Address and Created Date to identify relevant information to the user to allow the user to better identify where the records should be assigned. In certain aspects, the records placed in the assignment queue, and hence the records displayed, are based on a search against the target database using default fields identified by a user or administrator, however, the default fields may be modified by a user. In certain aspects, only records in the source data that have more than one possible match to target database objects, or no matches to target database objects, are included in the assignment queue (in this case, records having single matches may be automatically associated with or assigned to the matching target object). Also shown in FIG. 3*a* is a field having a dropdown menu 310 including a selection toggle 315. Field 310 is provided to allow a user to select among assignment options for records in the assignment queue as will be discussed in more detail below. Also included in FIG. 3*a* is a set of checkboxes 320 that allows a user to identify records to which a mass action should be applied as will be described below in more detail according to one embodiment. FIG. 3*b* shows an example of a user interface display panel 350 similar to the panel 300 shown in FIG. 3*a*, but without selection checkboxes 320.

Upon an indication to integrate records from an external source in the assignment queue, the system performs an initial search on certain record fields to determine potential matches to objects in the target database system. The initial search may occur responsive to a user selection of a drop-down menu 310, e.g., in real-time, according to one embodiment. Performing this search in real-time against the target database advantageously ensures that the most up-to-date information in the target database is used (e.g., newly created records or objects) when determining potential object matches. Alternatively, the search can be done prior to displaying the assignment queue records or prior to a user selection of a drop down menu. The potentially matching object are identified to the user to allow the user to quickly and easily assign the records to one (or more) of the identified objects should the matches satisfy the user. If the objects do not satisfy the user, the user is provided with additional options to find different objects and/or to create new objects or to leave the record in the queue for later or to not assign to an object, for example. In the current example, where a user is seeking to integrate Outlook contacts into Account objects, the system performs an initial search using certain columns from the Outlook records to determine possible Account objects in the target database system to which to add each record. The possible objects identified in the search are then displayable using the drop-down menu 315. Such certain columns might include an AccountName field or other field as identified by an administrator or other user.

Figure 3C:
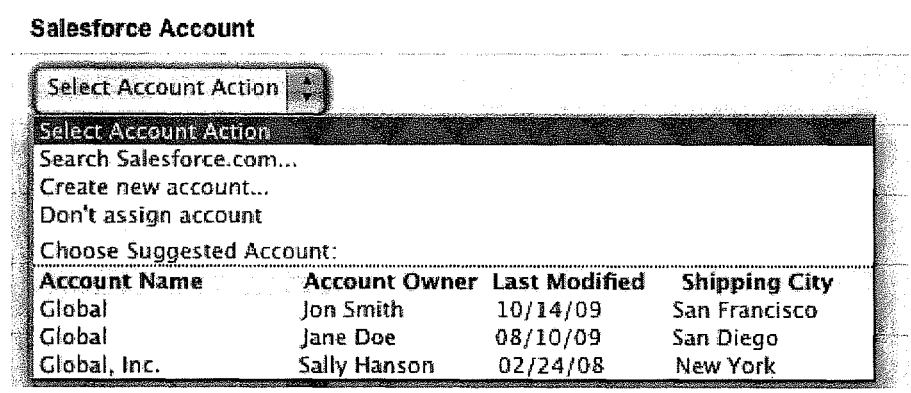
FIG. 3c illustrates an example of a customized drop-down menu including a table showing data for the identified Accounts according to one embodiment.

FIG. 3*c* illustrates an example of a customized drop-down menu 360 including a table 370 showing data for the identified Account objects according to one embodiment. The menu 360 includes a table 370 showing search results that might be what the user is interested in selecting, e.g., Accounts to which the user may wish to associate or assign the records. FIG. 3*d* illustrates the drop-down menu 360 of FIG. 3*c* as it might be displayed on the panel 300 of FIG. 3*a* upon selection of the drop-down toggle 315 associated with the first displayed Outlook record for Michael Abbott. Using the displayed menu 360, a user can select one of the options provided. For example, a user can select to assign the record for Michael Abbott with one of the listed Accounts in table 370, e.g., Account name: Global with Account owner: Jon Smith, or Account name: Global, Inc. with Account Owner: Sally Hanson. If an Account is selected by a user, the system assigns the data for the selected record to the selected Account. The data has already been loaded and synchronized from Outlook to the salesforce database and all contact information now exists as a salesforce.com contact object; this screen is for the user to associate or assign a contact in salesforce.com (that came from Outlook) to a salesforce.com Account, for example. The assignment connects the two salesforce records (the imported, synchronized record and the user-identified object) so that when a user later accesses either object (e.g., the contact or account), they can see the associated record listed. In certain aspects, an assignment is not made until a user has confirmed selections, e.g., by way of selecting a "save" button, or otherwise.

Figure 4A:
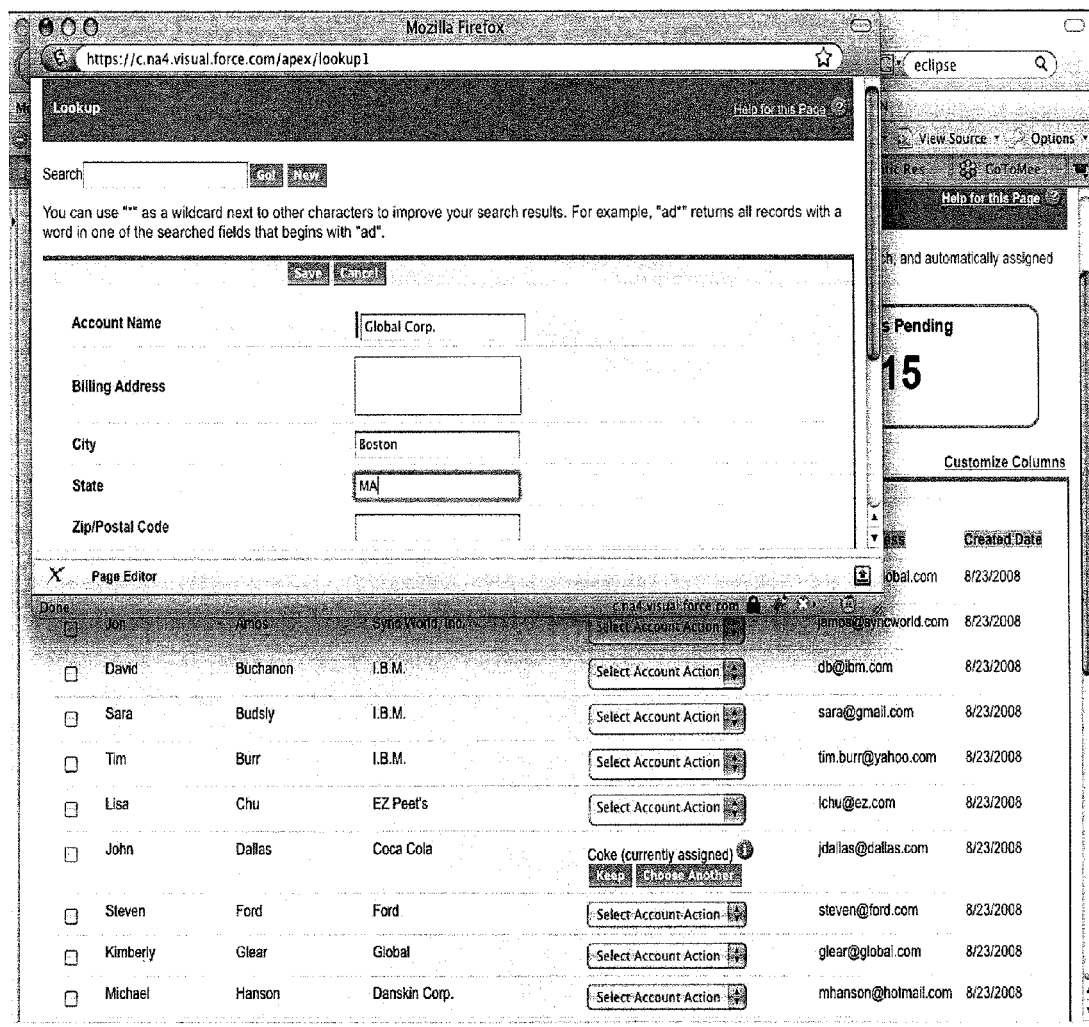
FIG. 4a illustrates a screenshot including a window panel that might be displayed upon the user selecting the option to create a new account.

Additionally, other actions may be taken using drop-down menu 360 if a user does not wish to use the search results provided in table 370. For example, as shown in FIG. 3c or 3d, a user may also select to search for additional Accounts, create a new Account or select an option to not assign to an Account. Other options may be provided as desired. FIG. 4a illustrates a screenshot including a window panel 400 that might be displayed upon the user selecting the option to create a new account. The pop-up window panel 400 displayed might include fields such as Account Name and other contact fields as shown allowing the user to input appropriate information. In the example shown in FIG. 4a, the user is creating an Account record named Global Corp to which to assign the fields of the contact record(s). FIG. 4b illustrates the panel of FIG. 3d after an assignment to newly created Global Corp. Account has been selected. In certain aspects, an assignment is not made until a user has confirmed selections, e.g., by way of selecting a "save" button 410, or otherwise.

FIG. 4c illustrates what might be displayed to the user subsequently after the user selects the drop-down menu toggle 415 for the second Outlook contact record that needs assignment to an Account object. Here, again, the displayed search results in table 470 identify potential Account objects to which fields in the contact record may have matched, specifically Account objects that had fields that matched to some degree with the Outlook company name field. FIG. 4d illustrates the panel of FIG. 4c after an assignment to the existing Sync World, Inc. Account has been selected. In certain aspects, an assignment is not made until a user has confirmed selections, e.g., by way of selecting a "save" button 410, or otherwise.

Figure 4E:
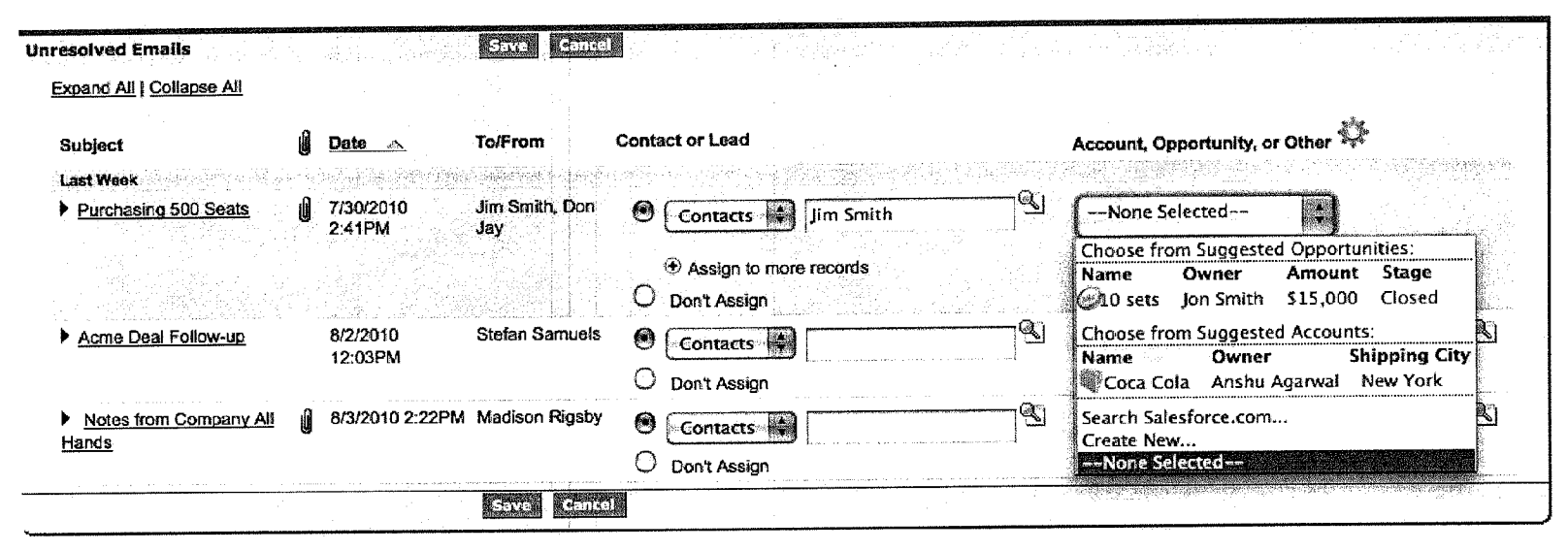

FIG. 4e illustrates a panel that might be displayed when a user seeks to assign synchronized events from an external source, such as Outlook events, into a multi-tenant database, such as provided by salesforce.com. As shown, multiple association types may occur. To accommodate multiple association types, icon indicators 430 are added into the search results to show the type of object, e.g., if the suggestion is for a contact or lead object, for example. Also, as shown in FIG. 4e, the user is provided with two drop-down menus; one drop-down contains suggestions for people associations and the other allows a user to relate the event to an opportunity, account, case, or other object. It will be appreciated that any number of drop-down menus may be displayed as desired for the particular data set.

Figure 6:
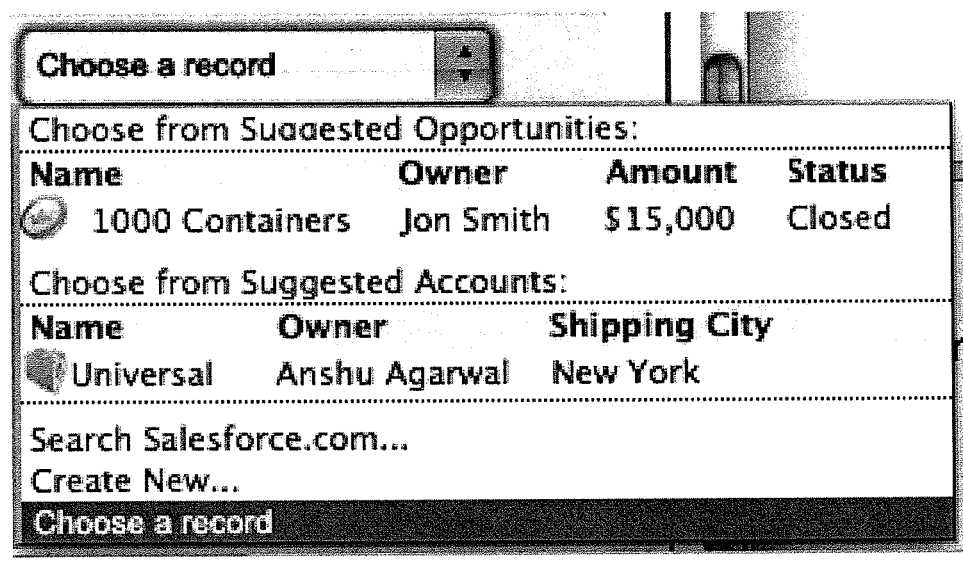
FIG. 6 illustrates a drop-down menu that shows multiple object types with different column headers according to one embodiment.
Figure 7:
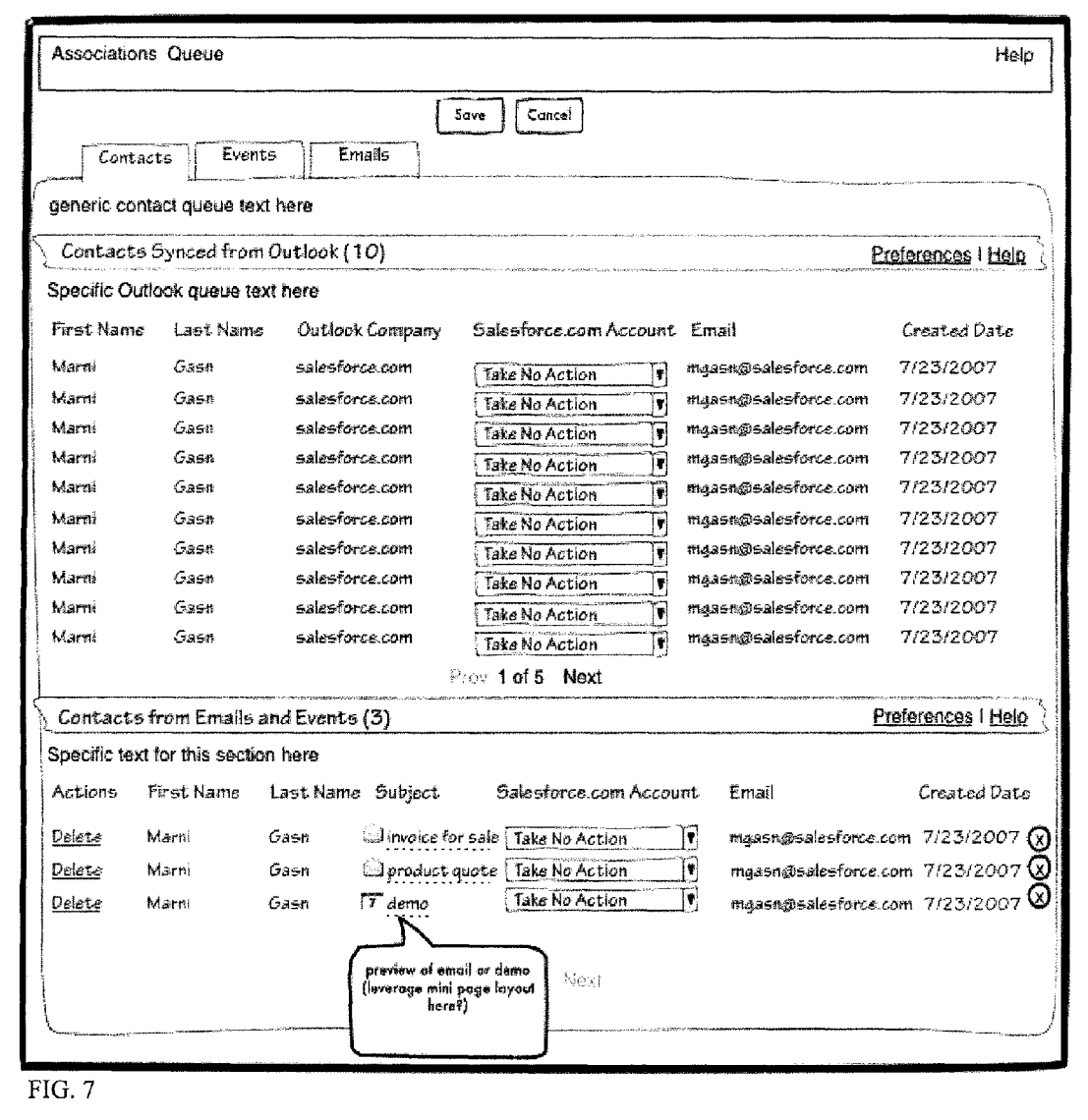

FIG. 6 illustrates a drop-down menu that shows multiple object types with different column headers according to one embodiment. FIG. 7 illustrates a panel having lists of contacts from a different source; in this example, contact records were brought in based on the "To" line in an email or event invite.

Figure 8:
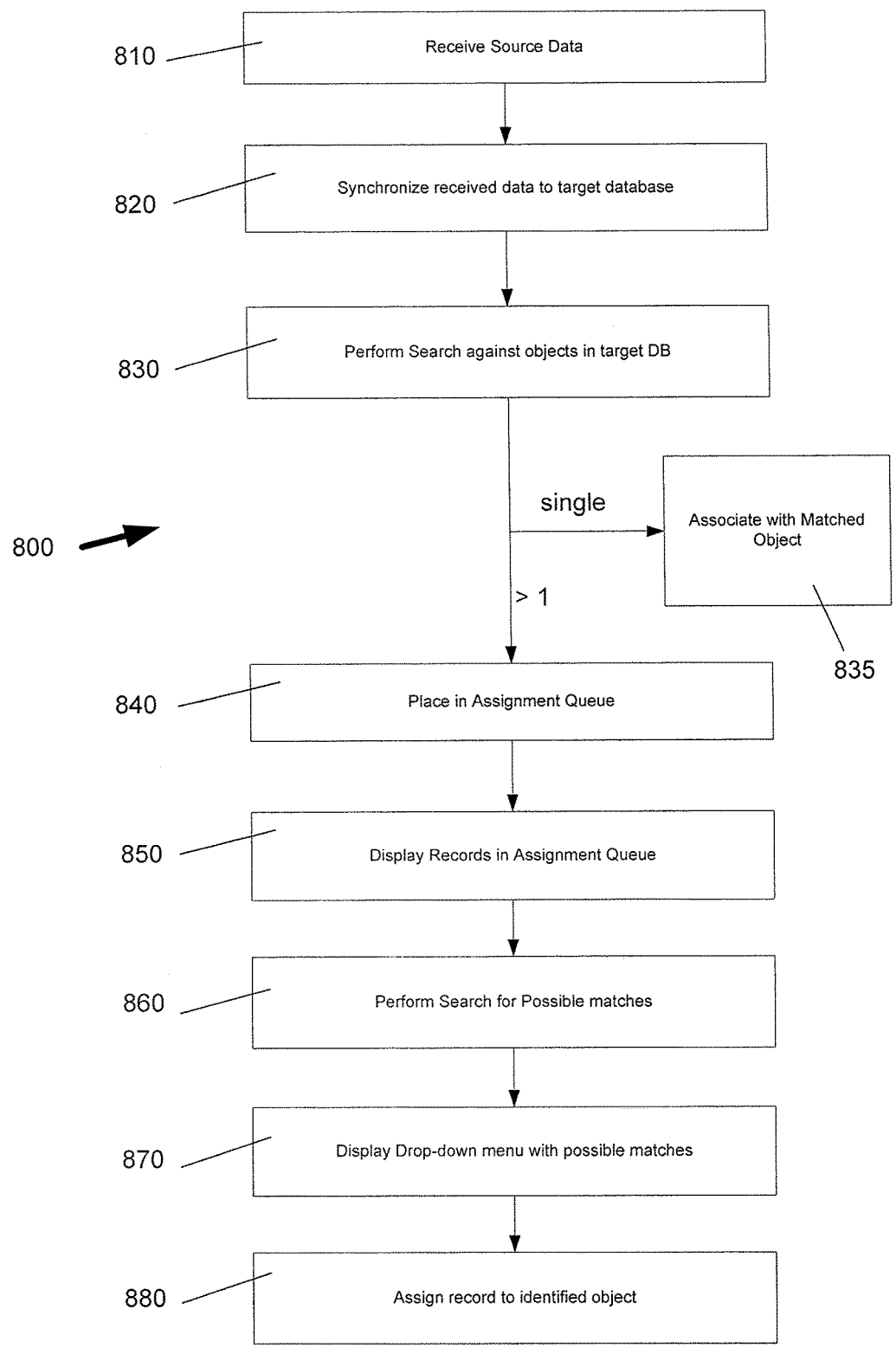
FIG. 8 illustrates a method, according to one embodiment, for integrating records or other data from a source database with a target database.

FIG. 8 illustrates a method 800, according to one embodiment, for integrating records or other data from a source database with a target database. In step 810, data is received from a source database. Such data might be in the form of Outlook contact records or events, or email or event invites. In step 820, the received data is synchronized to the target database system. For example, the data may be parsed and stored within one or more objects in the target database schema. In step 30, fields of the synchronized data are used to search against records in the target database system to identify potential matches of objects to which the records might be assigned. The fields to be used are predetermined, e.g., by an administrator or other user. For data records with more than one match, or no matches, those data records are placed in an assignment queue in step 840. In one embodiment, if there is a single exact match, the data record is automatically associated with or assigned to the matching object in the target database in step 835. Of course, data records having single matches can be placed in the assignment queue in certain embodiments. In step 850, a panel or other display is provided to a user, e.g., on a user system 12, identifying one or more of the records in the assignment queue. In one embodiment, a user-selectable drop-down menu item is provided for each record displayed in the panel. A search is performed in step 860 for records in the assignment queue against objects in the target database. In one embodiment, this search is performed for a record in real-time in response to the user selecting the drop-down menu item associated with that record. In other embodiments, this search is performed prior to such a user selection, and may even include the results of the search performed in step 830. In step 870, a drop-down menu is provided to the user, responsive to the user selection of the drop-down menu item. The drop-down menu, in certain embodiments, includes the results of the search performed in step 860. Examples of drop down menus can be found in FIGS. 3c, 3d, 4c, 4e, 5b and 6. In step 880, an assignment is made for any record for which the user has identified an object in the target database.

Mass Actions

In one embodiment, a user is able to select or otherwise identify records to be integrated and to apply mass actions to those records that are selected or identified. For example, in one embodiment, a user may select multiple contacts that are to be integrated into the database system, and select or identify an assignment operation on one of those records, and have all the selected records assigned in the same manner. FIG. 5a illustrates a display panel 500 including checkboxes 520 that allow a user to identify records to which mass actions can be applied. FIG. 5b illustrates selected checkboxes. As shown in FIG. 5b, a user has selected certain Outlook records to which a similar assignment should be performed. The user has also selected the drop-down menu to view options and potential Account objects in the target database system. FIG. 5c illustrates the panel of FIG. 5b after the user has selected a specific Account object (Account Name: I.B.M.) from the table in the drop-down menu for the Outlook record: David Buchanon. As shown, all Outlook records with checkboxes selected by the user were automatically identified to be assigned the same action as specified for the single record the user identified, namely assignment to the I.B.M. Account object. Upon confirmation by the user, the Outlook records are processed (e.g., assigned) according to the selected actions. Here, in FIG. 5c, upon selecting the "save" button, the first record would be assigned in the target database to the Global Corp. Account object, the second record would be assigned to the Sync World, Inc. Account object and the next three records would be assigned to the I.B.M. Account object.

Figure 5D:
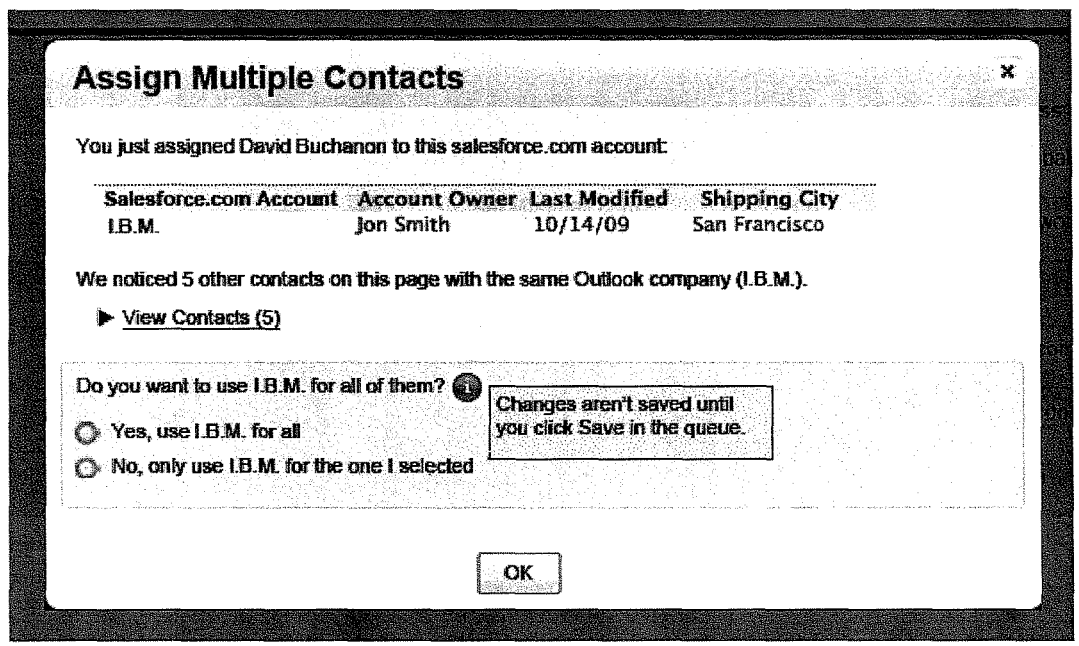
FIG. 5d illustrates a window that is displayed according to another embodiment for implementing mass actions.

FIG. 5d illustrates a window 510 that is displayed according to another embodiment for implementing mass actions. In this embodiment, upon selection of a contact for a specific record, window 510 is displayed that provides auto-suggestions to a user, and provides the user with the ability to apply the mass suggestion or not. For example, as shown, when the user selects the drop-down menu for the record for David Buchanon of FIG. 3b or of FIG. 4c for example, window 510 is displayed to indicate to the user that other contact records in the queue have associations with the same company name, in this case I.B.M., and asking if they would like to make similar assignments for those records.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
a database system implemented using a server system, the database system configurable to cause:
accessing a source database storing a plurality of source records in a first format, the first format capable of being used by a source application to process the source records, the source application provided by a first provider and providing at least one information management service;
determining, using the database system, that a portion of the source records are candidate source records to be assigned to a target database, the target database storing a plurality of target records in a second format different from the first format, the second format capable of being used by a target application to process the target records, the target application provided by a second provider different from and external to the first provider and providing at least one customer management service;
processing a selection of two or more of the candidate source records from the portion of source records, the two or more candidate source records capable of being assigned to a same target record;
responsive to the selection of the two or more candidate source records, identifying by a server associated with the database system:
a first target record as comprising a customer account, the identification of the first target record based on a name of an organization being associated with the two or more candidate source records and with the customer account, and
a second target record as comprising an opportunity, the opportunity being a potential sale or a pending sale, the identification of the second target record based on a purchase order being associated with the two or more candidate source records and with the customer account;
displaying a first item in a user interface on a display device, the first item comprising a representation of the identified customer account and a first visual indicator, the first visual indicator representing a first object type of the customer account;
displaying a second item in the user interface on the display device, the second item comprising a representation of the identified opportunity and a second visual indicator, the second visual indicator representing a second object type of the opportunity, the second object type being a different customer relationship management object type than the first object type;
processing a selection of the identified customer account, the selection submitted via the user interface on the display device; and
assigning, using the database system and in real-time with respect to processing the selection of the identified customer account, the two or more candidate source records to the selected customer account, the assignment being identifiable by data stored in the target database.

2. The system of claim 1, wherein the first item includes one or more additional selectable options.

3. The system of claim 2, wherein the one or more additional selectable options includes an option to create a new object.

4. The system of claim 2, wherein the one or more additional selectable options includes an option to perform an additional search.

5. The system of claim 1, wherein the identification of the first target record is done in real-time in response to receiving the selection of two or more candidate source records.

6. The system of claim 1, wherein the identification of the first target record is done prior to displaying the first item.

7. The system of claim 1, wherein assigning, by a server associated with the database system, includes associating fields of the two or more candidate source records with fields of the selected customer account.

8. The system of claim 1, wherein the source database is an Outlook file and wherein the target database is a multi-tenant database system.

9. A computer program product comprising computer-readable program code to be executed by at least one processor when retrieved from a non-transitory computer readable medium, the program code comprising instructions configurable to cause:
accessing a source database of a database system implemented using a server system, the source database storing a plurality of source records in a first format, the first format capable of being used by a source application to process the source records, the source application provided by a first provider and providing at least one information management service;
determining, using the database system, that a portion of the source records are candidate source records to be assigned to a target database, the target database storing a plurality of target records in a second format different from the first format, the second format capable of being used by a target application to process the target records, the target application provided by a second provider different from and external to the first provider and providing at least one customer management service;
processing a selection of two or more of the candidate source records from the portion of source records, the two or more candidate source records capable of being assigned to a same target record;
responsive to the selection of the two or more candidate source records, identifying by a server associated with the database system:

a first target record as comprising a customer account, the identification of the first target record based on a name of an organization being associated with the two or more candidate source records and with the customer account, and a second target record as comprising an opportunity, the opportunity being a potential sale or a pending sale, the identification of the second target record based on a purchase order being associated with the two or more candidate source records and with the customer account;

displaying a first item in a user interface on a display device, the first item comprising a representation of the identified customer account and a first visual indicator, the first visual indicator representing a first object type of the customer account;

displaying a second item in the user interface on the display device, the second item comprising a representation of the identified opportunity and a second visual indicator, the second visual indicator representing a second object type of the opportunity, the second object type being a different customer relationship management object type than the first object type;

processing a selection of the identified customer account, the selection submitted via the user interface on the display device; and assigning, using the database system and in real-time with respect to processing the selection of the identified customer account, the two or more candidate source records to the selected customer account, the assignment being identifiable by data stored in the target database.

10. The computer program product of claim 9, wherein the first item includes one or more additional selectable options.

11. The computer program product of claim 10, wherein the one or more additional selectable options includes an option to create a new object.

12. The computer program product of claim 10, wherein the one or more additional selectable options includes an option to perform an additional search.

13. The computer program product of claim 9, wherein the identification of the first target record is done in near real-time in response to receiving the selection of two or more candidate source records.

14. The computer program product of claim 9, wherein the identification of the first target record is done prior to displaying the first item.

15. The computer program product of claim 9, wherein the identification of the first target record is done prior to displaying the user interface on the display device.

16. The computer program product of claim 9, wherein the source database includes an Outlook file and wherein the target database is a multi-tenant database system.

17. A method comprising:

accessing a source database of a database system storing a plurality of source records in a first format, the first format capable of being used by a source application to process the source records, the source application provided by a first provider and providing at least one information management service;

determining, using the database system, that a portion of the source records are candidate source records to be assigned to a target database, the target database storing a plurality of target records in a second format different from the first format, the second format capable of being used by a target application to process the target records, the target application provided by a second provider different from and external to the first provider and providing at least one customer management service;

processing a selection of two or more of the candidate source records from the portion of source records, the two or more candidate source records capable of being assigned to a same target record;

responsive to the selection of the two or more candidate source records, identifying by a server associated with the database system:

a first target record as comprising a customer account, the identification of the first target record based on a name of an organization being associated with the two or more candidate source records and with the customer account, and a second target record as comprising an opportunity, the opportunity being a potential sale or a pending sale, the identification of the second target record based on a purchase order being associated with the two or more candidate source records and with the customer account;

causing display of a first item in a user interface on a display device, the first item comprising a representation of the identified customer account and a first visual indicator, the first visual indicator representing a first object type of the customer account;

causing display of a second item in the user interface on the display device, the second item comprising a representation of the identified opportunity and a second visual indicator, the second visual indicator representing a second object type of the opportunity, the second object type being a different customer relationship management object type than the first object type;

processing a selection of the identified customer account, the selection submitted via the user interface on the display device; and assigning, using the database system and in real-time with respect to processing the selection of the identified customer account, the two or more candidate source records to the selected customer account, the assignment being identifiable by data stored in the target database.

18. The method of claim 17, wherein the source database includes an Outlook file.

19. The method of claim 17, wherein the first item includes one or both of an option to create a new object, and an option to perform an additional search against objects in the target database.

* * * * *